United States Patent
Gray et al.

(10) Patent No.: US 10,250,390 B1
(45) Date of Patent: Apr. 2, 2019

(54) DATA HEALTH ASSURANCE USING PRIVATE PROOF OF AUTHORITY

(71) Applicant: BOOZ ALLEN HAMILTON INC., McLean, VA (US)

(72) Inventors: Chad Roberts Gray, Severn, MD (US); Peder Muller, Alexandria, VA (US); Corey Petty, Marriotsville, MD (US); Lucian Stroie, Greenwich, CT (US)

(73) Assignee: BOOZ ALLEN HAMILTON INC., McLean, VA (US)

( * ) Notice: Subject to any disclaimer, the term of this patent is extended or adjusted under 35 U.S.C. 154(b) by 0 days.

(21) Appl. No.: 15/924,057

(22) Filed: Mar. 16, 2018

(51) Int. Cl.
*H04L 29/06* (2006.01)
*H04L 9/32* (2006.01)
*H04L 9/06* (2006.01)
*G06F 17/30* (2006.01)

(52) U.S. Cl.
CPC ........ *H04L 9/3239* (2013.01); *G06F 17/3033* (2013.01); *H04L 9/0637* (2013.01); *H04L 63/20* (2013.01)

(58) Field of Classification Search
CPC ..... H04L 9/3239; H04L 9/0637; H04L 63/20; G06F 17/3033
See application file for complete search history.

(56) References Cited

U.S. PATENT DOCUMENTS

| | | | |
|---|---|---|---|
| 7,876,748 B1* | 1/2011 | Conner | G06F 17/3033 370/389 |
| 2005/0204170 A1* | 9/2005 | Belenky | H04L 9/3239 726/5 |
| 2005/0210035 A1* | 9/2005 | Kester | G06F 11/3476 |
| 2009/0268913 A1* | 10/2009 | Zhang | H04L 9/12 380/274 |
| 2015/0120754 A1* | 4/2015 | Chase | G06F 17/3033 707/747 |
| 2015/0244973 A1* | 8/2015 | Mullen | H04N 5/913 386/252 |
| 2016/0191530 A1* | 6/2016 | Jain | H04L 63/101 726/4 |
| 2017/0091726 A1* | 3/2017 | Morgan | G06Q 20/382 |
| 2017/0134162 A1* | 5/2017 | Code | H04L 9/0637 |
| 2017/0373859 A1* | 12/2017 | Shors | H04L 9/3247 |
| 2018/0101906 A1* | 4/2018 | McDonald | G06Q 40/04 |

* cited by examiner

*Primary Examiner* — John B King
(74) *Attorney, Agent, or Firm* — Buchanan Ingersoll & Rooney PC (57) ABSTRACT

A method of securing a network including parsing a first data packet into at least one portion using a first device, such that the at least one portion includes a portion designated as an index identifier. The method includes hashing the at least one portion of the first data packet using the first device and the index identifier, and hashing, using the first device and the index identifier, at least one portion of a second data packet. The method includes combining, using the first device and the index identifier, the hashed portions of the first data packet and the second data packet, and hashing, using the first device and the index identifier, at least one portion of the combined hashed portions of the first data packet and the second data packet into a first combined data packet hash. The method can provide an indication of network security.

25 Claims, 4 Drawing Sheets

FIG. 1: Node Device Architecture Functions

FIG. 2: Remote Node Device Architecture Functions

FIG. 3: High Level System Block Diagram

FIG. 4: Node Architecture

DATA HEALTH ASSURANCE USING PRIVATE PROOF OF AUTHORITY

FIELD

An aspect of the present disclosure provides a method and a device for securing a network.

BACKGROUND INFORMATION

Almost all networks, regardless of physical or logical architecture encounter information security challenges. In some cases, such as Industrial Control Systems (ICS), these challenges are even more pronounced as environmental factors force compromised security postures.

ICS is a generic term describing the relationship between hardware, software and network connectivity. Each ICS is tailored to its industry and functions accordingly. Industrial control systems are used in the majority of the industrial sector, but it is also important to critical infrastructure. Transport, energy, water treatment all rely on ICS.

The continuous functioning of the ICS can be important, the components of which have a sole purpose of running and doing repetitive tasks. Hence, any downtime can come with costly repairs and even dangerous ramifications. If the ICS does not operate correctly, minor issues can escalate rapidly. For instance, a pump might not be operating correctly or reporting its current state correctly to the Human Machine Interface (HMI). Or, a valve might be shut when the HMI indicates that it is open and venting, causing the operator to miss a potentially dangerous situation. Either of these instances could be major issues for any industrial production and a great source of concern to critical infrastructure.

When considering the current state of Industrial Control Systems one should envision not only the examples provided above but also other, more serious threats. There have been numerous examples of cyber-attacks on ICS' over the years and the rate has increased drastically. Many industrial control systems run on legacy hardware, not considering modern vulnerabilities that arise with technological advances. Considering that these systems can be connected and can include legacy devices, they can generally be classified as vulnerable. From 2015 to 2016, attacks on ICS went up 110 percent with the United States being the largest target of attacks. This can mostly be explained by the fact that the US has the largest ICS presence. Some of the notable attacks on ICS include the 2016 New York Dam attack, the 2015 Ukraine Power Outage, and the 2010 Siemens Stuxnet.

This disclosure addresses a Man-in-the-middle attack, which is basically when an attacker can simulate one end of the communications line in order to submit commands. The attacker can spoof a user to the system and issue commands without the normal operator ever knowing.

Man-in-the-middle attacks can be performed on control system protocols if the attacker knows the protocol being manipulated. An attacker can modify packets in transit, providing both a full spoof of the operator HMI displays and full control of the control system. By inserting commands into the command stream the attacker can issue arbitrary or targeted commands. By modifying replies, the operator can be presented with a modified picture of the process.

Lack of encryption and mutual authentication expose ICS to alteration of in-transmission instructions, commands, or alarms by network intruders. Replay attacks can trigger automatic system responses resulting in unpredictable malfunctions. Spoofing attacks can cause inaccurate monitoring data that could be presented to system operators, prompting inappropriate and potentially dangerous human intervention. Network sniffing may expose confidential data to invisible interception for governmental or industrial espionage, terrorist attacks, or criminal pursuits. Hence, an attacker who knows which protocols the ICS is using can easily perform a Man-in-the-middle attack. The attacker can alter packets that are in transit taking control of the HMI, and also issue random commands to the PLC.

Known public blockchains use consensus models based in proof-of-work (PoW) and proof-of-stake (PoS). These blockchains have considerations such as incentive to power the trustless nature of many blockchains. Models such as PoW involve incredible amounts of compute power to maintain a stable blockchain consensus environment. Despite the amount of power this model involves, it has been deemed necessary in a public environment.

SUMMARY

A method of securing a network is disclosed, the method comprising parsing a first data packet into at least one portion using a first device, wherein the at least one portion includes a portion designated as an index identifier; hashing the at least one portion of the first data packet using the first device and the index identifier; hashing, using the first device and the index identifier, at least one portion of a second data packet; combining, using the first device and the index identifier, the hashed portions of the first data packet and the second data packet; hashing, using the first device and the index identifier, at least one portion of the combined hashed portions of the first data packet and the second data packet into a first combined data packet hash; receiving a second combined data packet hash from a distributed ledger; and comparing the first combined data packet hash and the second combined data packet hash to provide an indication of network security.

A network device is disclosed, the network device comprising a processor and an associated memory, wherein the processor includes a parsing module configured to parse a first data packet into at least one portion, wherein the at least one portion includes a portion designated as an index identifier; and a hashing module configured to hash the at least one portion of the first data packet using the index identifier, and hash at least one portion of a second data packet using the index identifier, wherein the processor is configured to combine the hashed portions of the first data packet and the second packet using the index identifier, wherein the parsing module is configured to hash at least one portion of the combined hashed portions of the first data packet and the second packet into a first combined data packet hash using the index identifier, and wherein the processor is configured to receive a second combined data packet hash from a distributed ledger, and compare the first combined data packet hash and the second combined data packet hash to provide an indication of network security.

BRIEF DESCRIPTION OF THE DRAWINGS

Other objects and advantages of the present disclosure will become apparent to those skilled in the art upon reading the following detailed description of exemplary embodiments, in conjunction with the accompanying drawings, in which like reference numerals have been used to designate like elements, and in which.

DETAILED DESCRIPTION

An aspect of the present disclosure provides for Blockchain Based Network Security (BBNS) that can, for example, exploit the power of distributed ledger technology (DLT) or blockchain for addressing the aforementioned security issues. Exemplary embodiments provide a finished cyber security suite with functions that are based in a proof-of-authority blockchain data structure. A blockchain backbone of the Blockchain Based Network Security can reside outside of attack vectors on the network it protects. Blockchain Based Network Security can leave virtually zero footprints with minimal hardware and with fewer infrastructure changes, create negligible network overhead, and avoid emitting indications of its existence on the network. In an exemplary embodiment, Blockchain Based Network Security can integrate with Splunk environments, empowering administrators to monitor network traffic conditions with near real-time trusted analytics verified through blockchain technology.

The disclosed Blockchain Based Network Security can provide for a cyber-security posture by leveraging a private proof-of-authority (PoA) blockchain. Private blockchains are not 'trustless' environments. This can change a consensus specification in that privately maintained blockchains do not need to mathematically ensure truth as with trustless PoW consensus models. Instead of relying on miners racing against each other to solve a PoW cryptographic puzzle required to confirm a block, PoA utilizes a pool of trusted authenticators who take turns in confirming blocks. This provides a number of advantages. For example, the blockchain can handle many more transactions per second. Excessive power requirements can be avoided as PoA does not need to try trillions of hashes per second to close a block. The blockchain can also provide greater flexibility to scale for larger applications/networks.

An aspect of the present disclosure focuses on data health assurance. For example, by committing endpoint device transmission to the blockchain, tamper free traffic can be confirmed as having reached both ends of a transmission. Through confirmation hashes in the blockchain, network administrators can have confidence in knowing that packet pairs sent between administrative network endpoints and remote operational network endpoints have not succumbed to cyber threats such as a Man-in-the-middle attack. An aspect of the disclosure provides administrators with a tool in triaging data corruption, regardless of source.

Figure 1:
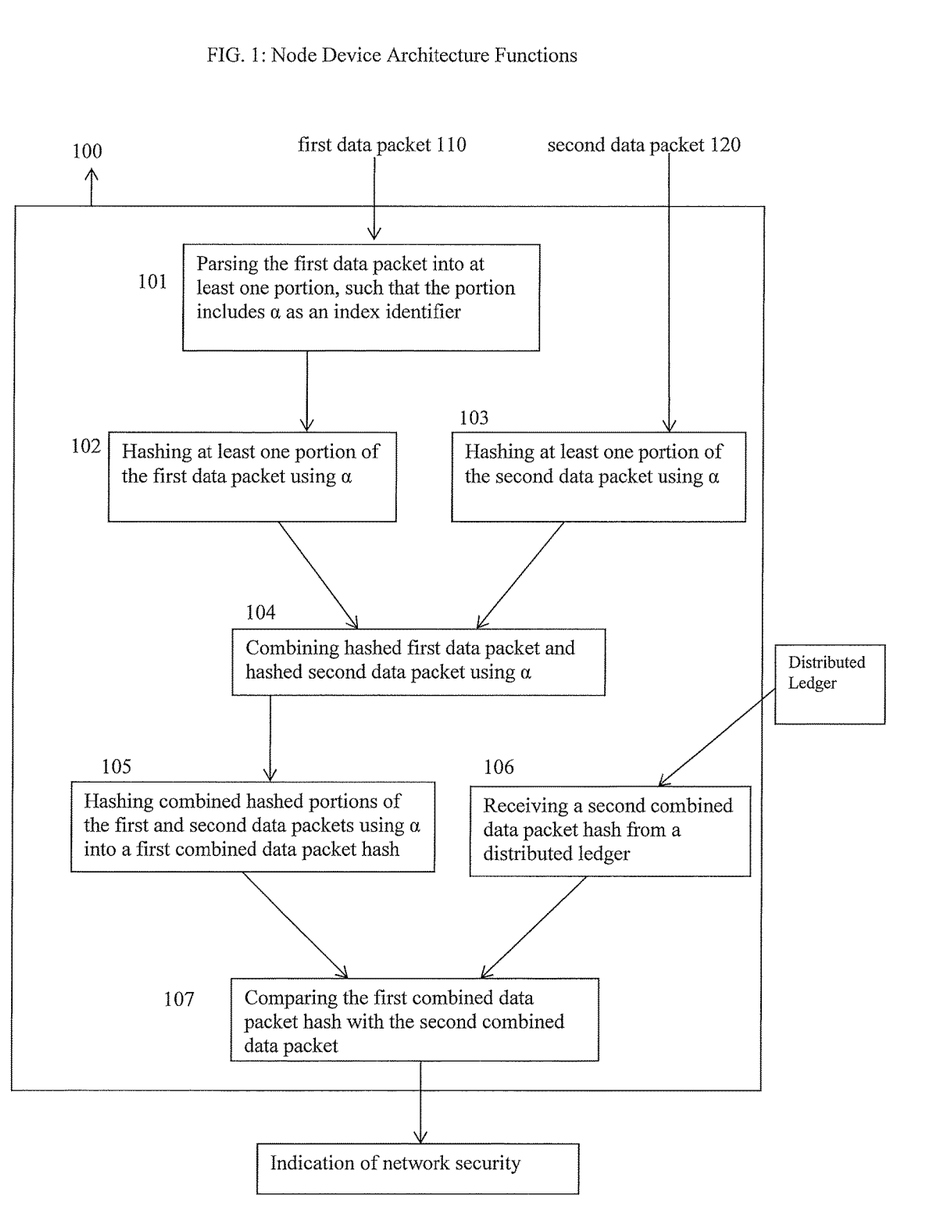
FIG. 1 illustrates exemplary node device architecture functions for implementing an embodiment of the present disclosure.
Figure 2:
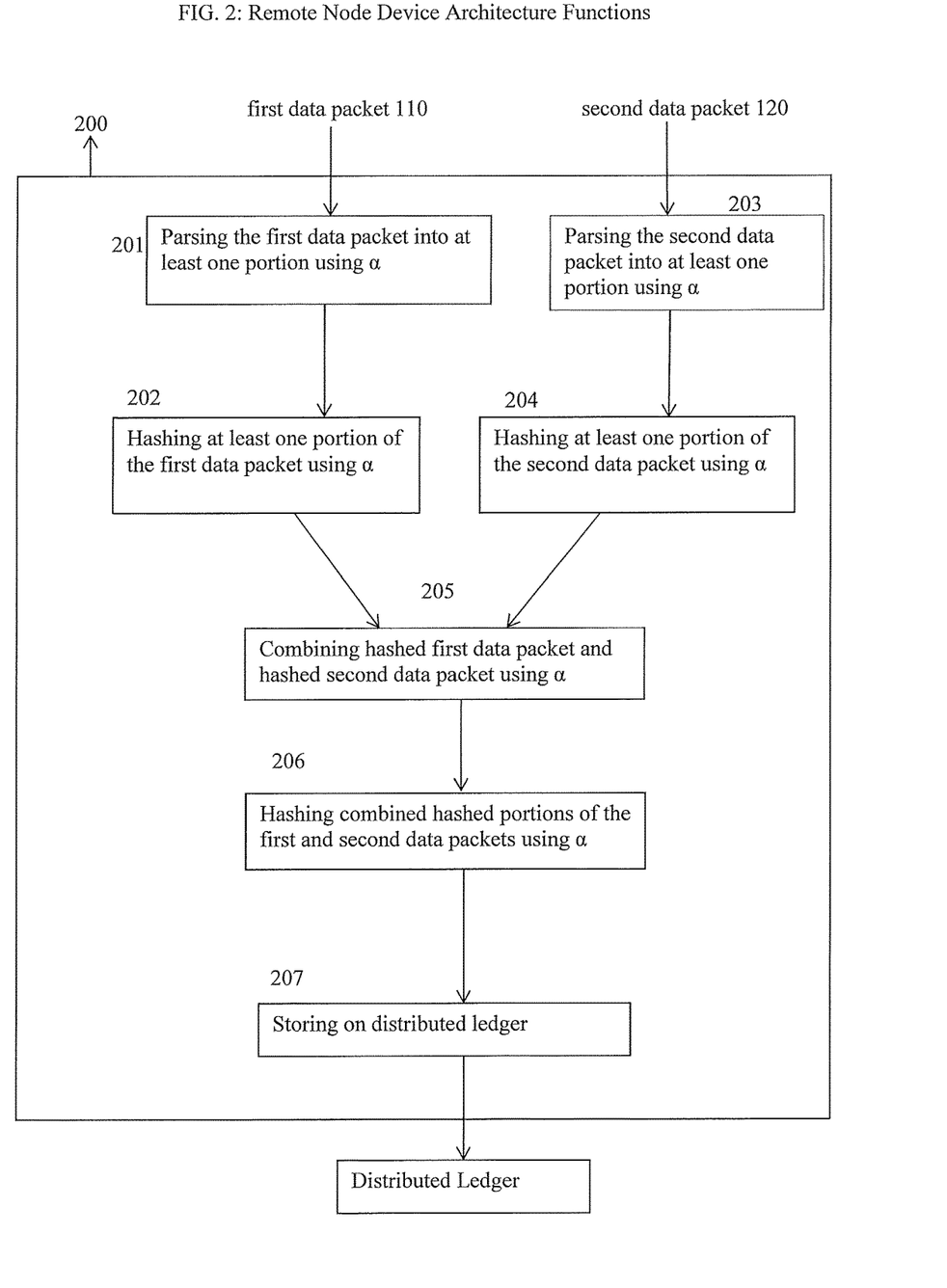
FIG. 2 illustrates exemplary remote node device architecture functions for implementing an embodiment of the present disclosure.
Figure 4:
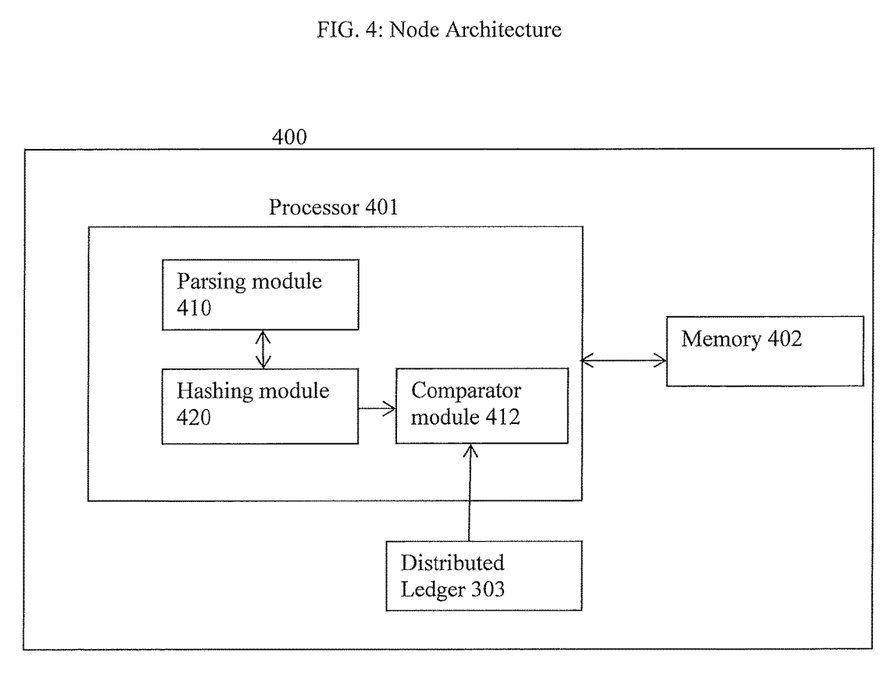
FIG. 4 illustrates an exemplary node architecture for implementing an embodiment of the present disclosure.

FIG. 1 and FIG. 2 show exemplary methods that can be implemented by node device architecture(s) according to an embodiment of the present disclosure, For example, the method can be based on the node device architecture shown in FIG. 4 which can combine hashing security with ledger security to provide enhanced network security.

The FIG. 1 method can include parsing a first data packet into at least one portion using a first device, wherein the at least one portion includes a portion designated as an index identifier. For example, in step 101 of FIG. 1, the first data packet 110 is parsed into at least one portion using the node device 100, such that the at least one portion includes a as an index identifier. The first data packet 110 can include a basic unit of communication over a network. Parsing the first data packet 110 can include analyzing the data packet into one or more portions and describe the role of each of the portions. The index identifier $\alpha$ can be a unique identifier that can be used to index the first data packet 110.

The FIG. 1 method can include hashing the at least one portion of the first data packet using the first device and the index identifier. For example, in step 102 of FIG. 1, the first data packet 110 can be hashed using the node device 100 and the index identifier $\alpha$. Hashing can include a function that can be used to map data of any size to a fixed size. One use of hashing is a data structure called a hash table that is widely used in computer software for rapid data lookup. Hash functions can accelerate table or database lookup by detecting duplicated records in a large file.

The FIG. 1 method can include hashing, using the first device and the index identifier, at least one portion of a second data packet. For example, in step 103 of FIG. 1, at least one portion of a second data packet 120 can be hashed using the node device 100 and the index identifier $\alpha$. In an exemplary embodiment, the second data packet 120 can be different from the first data packet 110. The second data packet 120 can have the same unique identifier as the index identifier $\alpha$ of the first data packet 110. The second data packet 120 can have unique identifier that is different from the index identifier $\alpha$ of the first data packet 110.

The FIG. 1 method can include combining, using the first device and the index identifier, the hashed portions of the first data packet and the second data packet. For example, in step 104 of FIG. 1, the hashed portions of the first data packet 110 and the hashed portions of the second data packet 120 are combined using the index identifier $\alpha$ and using the node device 100. In an exemplary embodiment, the combining of the hashed portions of the first data packet and the second data packet can include a merging of the two data packets that can use an index identifier as a key to merge the two data packets.

The FIG. 1 method can include hashing, using the first device and the index identifier, at least one portion of the combined hashed portions of the first data packet and the second data packet into a first combined data packet hash. For example, in step 105 of FIG. 1, at least one portion of the combined hashed portions of the first data packet 110 and the second data packet 120 are hashed into a first combined data packet hash, using the index identifier $\alpha$ and the node device 100. In an exemplary embodiment, hashing can include mapping one or more portions of the combined hashed portion of the first data packet to one or more portions of the combined hashed portion of the second data packet, using an index identifier.

The FIG. 1 method can include receiving a second combined data packet hash from a distributed ledger, and comparing the first combined data packet hash and the second combined data packet hash to provide an indication of network security. For example, in step 106 of FIG. 1, the node device 100 is configured to receive a second combined data packet hash from a distributed ledger. For example, in step 107 of FIG. 1, the node device 100 is configured to compare the first combined data packet hash with the second combined data packet hash to provide an indication of network security. In an exemplary embodiment, the first combined data packet can be stored in a local memory or remote memory, and the second combined data packet can be stored in a distributed ledger. In an exemplary embodiment, the second combined data packet can be stored in a local or remote memory, and the first combined data packet can be stored in a distributed ledger. In an exemplary embodiment, the second combined data packet and the first combined data packet are compared in real-time, without being stored in a memory or distributed ledger. In an exemplary embodiment, one of the second combined data packet and the first combined data packet can be stored in a memory or distributed ledger, with the other being accessed in real-time.

Real-time can refer to a system that can provide responses within specified time constraints. The time-constraints can, for example, be of order of milliseconds or lesser or greater. A real-time system can control an environment by receiving data, processing them, and returning the results sufficiently quickly to affect the environment at that time.

Network security can relate to the policies and practices adopted to prevent and monitor unauthorized access, misuse, modification, or denial of a computer network and network-accessible resources. Network security can involve the authorization of access to data in a network, which may be controlled by the network administrator. Network security can cover a variety of computer networks, both public and private, that are used in everyday jobs; conducting transactions and communications among businesses, government agencies and individuals. Networks can be private, such as within a company, and others which might be open to public access. Network security can be involved in organizations, enterprises, and other types of institutions. An indication of network security may provide information related to whether the network is secure or has been breached.

FIG. 2 shows an exemplary method that can be implemented on node device architecture according to another embodiment that, for example, interfaces a node device architecture configured to implement the FIG. 1 method.

The FIG. 2 method can include parsing the first data packet using a second device and the index identifier. For example, in step 201 of FIG. 2, the first data packet 110 can be parsed into at least one portion using the remote node device 200 and the index identifier α. In an exemplary embodiment, the first data packet 110 can include a basic unit of communication over a network. Parsing the first data packet 110 can include analyzing the data packet into one or more portions and describe the role of each of the portions.

The FIG. 2 method can include hashing, using the second device and the index identifier, at least one portion of the first data packet parsed by the second device. For example, in step 202 of FIG. 2, at least one portion of the first data packet can be hashed using the remote node device 200 and the index identifier α. In an exemplary embodiment, hashing can include a function that can be used to map data of any size to a fixed size. One use of hashing is a data structure called a hash table that is widely used in computer software for rapid data lookup. Hash functions can accelerate table or database lookup by detecting duplicated records in a large file.

The FIG. 2 method can include parsing the second data packet using the second device and the index identifier. For example, in step 203 of FIG. 2, the second data packet 120 can be parsed into at least one portion using the remote node device 200 and the index identifier α. In an exemplary embodiment, the second data packet 120 can include a basic unit of communication over a network. Parsing second data packet 120 can include analyzing the data packet into one or more portions and describe the role of each of the portions.

The FIG. 2 method can include hashing, using the second device and the index identifier, at least one portion of the second data packet parsed by the second device. For example, in step 204 of FIG. 2, at least one portion of the second data packet can be hashed using the remote node device 200 and the index identifier α.

The FIG. 2 method can include combining, using the second device and the index identifier, the hashed portions of the first data packet and the second data packet. For example, in step 205 of FIG. 2, the hashed portions of the first data packet and the second data packet are combined using the remote node device 200 and the index identifier α. In an exemplary embodiment, the combining of the hashed portions of the first data packet and the second data packet can include a merging of the two data packets that can use the index identifier as a key to merge the two data packets.

The FIG. 2 method can include hashing, using the second device and the index identifier, at least one portion of the combined hashed portions of the first data packet and the second data packet. For example, in step 206 of FIG. 2, at least one portion of the combined hashed portions of the first data packet and the second data packet are hashed using the remote node device 200 and the index identifier α.

The FIG. 2 method can include storing, using the second device, the hashed portion of the combined hashed portions on the distributed ledger. For example, in step 207 of FIG. 2, the remote node device 200 is configured to store the hashed portion of the combined hashed portions on the distributed ledger 303.

Figure 3:
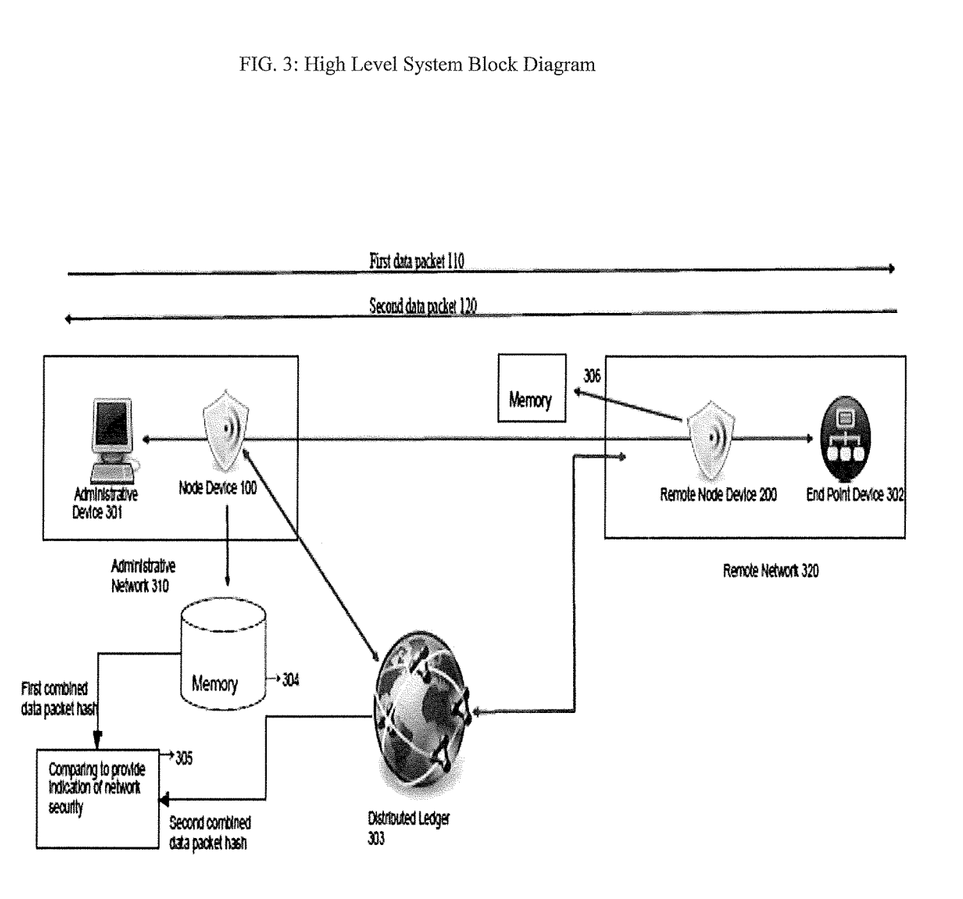
FIG. 3 illustrates an exemplary high level system block diagram for implementing an embodiment of the present disclosure.

The local memory used in conjunction with node device architectures that implement the FIG. 1 and/or FIG. 2 methods can be a portion of memory designated exclusive to a single unit of a device. The local memory can also be a memory specific to a single function or program. For example, FIG. 3 shows the local memories 304 and/or 306. The remote memory can be a memory that does not reside in a device, or resides in a different device. Depending on the exact configuration and type of computing device, the memory can be volatile (such as RAM), non-volatile (such as ROM, flash memory, etc.) or some combination of the two. The computer memory includes, but is not limited to, RAM, ROM, EEPROM, flash memory or other memory technology CDROM, digital versatile disks (DVD) or other optical storage, magnetic cassettes, magnetic tape, magnetic disk storage or other magnetic storage devices, or any other medium which can be used to store the desired information and which can accessed by the device. For example, as shown in FIG. 3, a remote memory can be the memory 304 and/or 306.

In an exemplary embodiment, the distributed ledger 303 (also called a shared ledger, or distributed ledger technology, DLT), can be a consensus of replicated, shared, and synchronized digital data geographically spread across multiple sites, countries, or institutions. Therefore, in an exemplary embodiment, there may be no central administrator or centralized data storage on the distributed ledger. The distributed ledger 303 can be implemented on a peer-to-peer network and may require consensus algorithms to ensure replication across nodes is undertaken. One form of distributed ledger design is the blockchain system, which can be either public or private. In an exemplary embodiment, a blockchain can be one type of data structure considered to be the distributed ledger 303.

In an exemplary embodiment, the blockchain can be a continuously growing list of records, called blocks, which can be linked and secured using cryptography. Each block can contain a cryptographic hash of the previous block, a timestamp and transaction data. The blockchain can be resistant to modification of the data. For example, to use as the distributed ledger 303, the blockchain can be managed by a peer-to-peer network collectively adhering to a protocol for validating new blocks. Once recorded, the data in any given block cannot be altered retroactively without the alteration of all subsequent blocks, which may happen after the collusion of the network majority.

FIG. 3 illustrates an exemplary system architecture and an associated high level functional block diagram for implementing a system of the present disclosure. In FIG. 3, the use of memory 304 is optional. That is, in one exemplary embodiment the memory 304 can be used, and in another exemplary embodiment the memory 304 may not be used.

In FIG. 3, the use of memory 306 is optional. That is, in one exemplary embodiment the memory 306 can be used, and in another exemplary embodiment the memory 306 may not be used. In FIG. 3, the comparing to provide indication of network security 305 can be performed in various kinds of devices that may local or remote. In an exemplary embodiment, the comparing can be performed by the node device 100. The administrative device 301, and/or the remote node device 200, and/or endpoint device 302, and/or a front-end application may be used for performing the comparison. In an exemplary embodiment, the front-end application can interact with users of the application directly.

The method can include identifying that the network is secure, when the first combined data packet hash and the second combined data packet hash stored on the distributed ledger are determined to be identical. For example, in FIG. 3, the first combined data packet hash received from the memory 304 and the second combined data packet hash received from the distributed ledger 303, are compared at 305. The network can be considered secure when the first combined data hash is identical to the second combined data hash. The network can be considered insecure when the first combined data hash is different from the second combined data hash.

The method can include transmitting the first data packet from an administrative device to the first device, and transmitting the second data packet from a remote device to the administrative device. For example, in FIG. 3, the first data packet 110 is transmitted from administrative device 301 to the node device 100, and the second data packet 120 is transmitted from the remote node device 200 to the administrative device 301.

In an exemplary embodiment, the administrative device 301 can be a device that can log into the other network devices such as switches, wireless access points, routers, and gateways, (normally through SSH), in order to perform the configuration and maintenance of the other network devices. In an exemplary embodiment, the remote node device 200 can be located at a distance from the administrative device.

The method can include transmitting the first data packet from a remote device to the first device such that the remote device is an endpoint device. For example, in FIG. 3, the first data packet 110 is transmitted from the remote node device 200 to the node device 100. In an exemplary embodiment, the endpoint device 302 and the remote node device 200 can be a single device. The endpoint device 302 can act as an endpoint in a distributed computing system. The endpoint device 302 can be Internet-connected PC hardware on a TCP/IP network. The endpoint device 302 can be on various network types in which users can access information from a network. The endpoint device 302 can include desktop or laptop computers, portable devices like tablets and smart phones, and other types of hardware installations, such as retail kiosks.

The method can include that the second data packet is a response to the first data packet. For example, in FIG. 3, the second data packet 120 can be response to the first data packet 110. The response can be in a form of an acknowledgment response or a substantive response. An acknowledgment response can include a message that the second data packet has been received and understood. A substantive response can include a message that contains information required to respond to the first data packet.

The method can include transmitting the second data packet from the remote device, wherein the second device is a remote device. For example, in FIG. 3, the second data packet 120 is transmitted from the remote node device 200.

The method can include that the at least one portion of the first data packet includes a concatenated string of at least a plurality of portions of the first data packet, and that the concatenated string includes a Javascript Object Notation (json). For example, the concatenated string can include joining of the plurality of portions of the first data packet 110 in a string format. String concatenation can be performed by using a binary infix operator. The +(plus) operator can be overloaded to denote concatenation for string arguments. Other separate operators can be used for string concatenation, particularly to specify implicit type conversion to string, as opposed to more complicated behavior for generic plus. String concatenation can be performed without any operator. JavaScript Object Notation can be an open-standard file format that uses human-readable text to transmit data objects consisting of attribute-value pairs and array data types (or any other serializable value). JSON can be a language-independent data format.

The method can include that the first data packet includes at least one of routing information, payload information, and the index identifier, and the second data packet includes at least one of routing information, payload information, and the index identifier. For example, the routing information of the first data packet 110 and/or the second data packet 120 can include information on a process of routing for selecting a path for traffic in a network, or between or across multiple networks. Routing can be performed for many types of networks, including circuit-switched networks, such as the public switched telephone network (PSTN), computer networks, such as the Internet. In packet switching networks, routing can be the higher-level decision making that directs network packets from their source toward their destination through intermediate network nodes by specific packet forwarding mechanisms. Packet forwarding can be the transit of logically addressed network packets from one network interface to another. Intermediate nodes can be network hardware devices such as routers, bridges, gateways, firewalls, or switches. General-purpose computers can forward packets and perform routing. The routing process can direct forwarding on the basis of routing tables, which maintain a record of the routes to various network destinations. Routing algorithms can use one network path at a time. Multipath routing techniques can enable the use of multiple alternative paths.

In an exemplary embodiment, the payload information of the first data packet 110 and/or the second data packet 120 can be the part of transmitted data that is the actual intended message. Headers and metadata are sent only to enable payload delivery. In computer security, payload can be a part of the private user text which could also contain malware such as worms or viruses which performs the malicious action; deleting data, sending spam or encrypting data. In addition to the payload, such malware can have an overhead code aimed at simply spreading itself, or avoiding detection.

In an exemplary embodiment, the index identifier of the first data packet and/or the second data packet can be the index identifier α of FIG. 1.

The method can include storing the hashed portion of the first data packet in combination with a hashed portion of the second data packet in a computer memory device that is local to the first device or remote. For example, in FIG. 3, the hashed portion of the first data packet 110 can be stored in combination with a hashed portion of the second data packet 120 in memory 304. The memory 304 can be local computer memory that can be a portion of memory designated exclusive to a single unit of the first device. The local computer memory can also be memory specific to a single function or program. The memory 304 can be a remote computer memory that resides in a different device. Depending on the exact configuration and type of computing device, memory can be volatile (such as RAM), non-volatile (such as ROM, flash memory, etc.) or some combination of the two. The memory 304 includes, but is not limited to, RAM, ROM, EEPROM, flash memory or other memory technology CDROM, digital versatile disks (DVD) or other optical storage, magnetic cassettes, magnetic tape, magnetic disk storage or other magnetic storage devices, or any other medium which can be used to store the desired information and which can accessed by the device. The memory 304 can be a database or a log file.

The method can include that the distributed ledger is configured on at least one of at least one computer memory device located external to the first device and the second device, the first device, and the second device. For example, in FIG. 3, the distributed ledger 303 can be configured on a computer memory device located external to the node device 100. The distributed ledger 303 can be configured on a computer memory device located external to the remote node device 200. The distributed ledger 303 can be configured on the node device 100. The distributed ledger 303 can be configured on the remote node device 200.

The method can include that the at least one computer memory device can be configured on different types of memory. In an exemplary embodiment, the distributed ledger 303 can be configured on different types of memory that can be any computer-readable medium. The term "computer-readable medium" (or "machine-readable medium") as used herein is an extensible term that refers to any medium or any memory, that participates in providing instructions to a processor, (such as processor) for execution, or any mechanism for storing or transmitting information in a form readable by a machine (e.g., a computer). Such a medium may store computer-executable instructions to be executed by a processing element and/or control logic, and data which is manipulated by a processing element and/or control logic, and may take many forms, including but not limited to, non-volatile medium, volatile medium, and transmission medium. Transmission media includes coaxial cables, copper wire and fiber optics, including the wires that include bus. Transmission media can also take the form of acoustic or light waves, such as those generated during radio-wave and infrared data communications, or other form of propagated signals (e.g., carrier waves, infrared signals, digital signals, etc.). Forms of computer-readable media include, for example, a floppy disk, a flexible disk, hard disk, magnetic tape, or any other magnetic medium, a CD-ROM, any other optical medium, punch-cards, paper-tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to a processor for execution. For example, the instructions may initially be carried on a magnetic disk of a remote computer. The remote computer can load the instructions into its dynamic memory and send the instructions over a telephone line using a modem. A modem local to computer system can receive the data on the telephone line and use an infra-red transmitter to convert the data to an infra-red signal. An infra-red detector can receive the data carried in the infra-red signal and appropriate circuitry can place the data on bus. Bus carries the data to main memory, from which processor retrieves and executes the instructions. The instructions received by main memory may optionally be stored on storage device either before or after execution by processor.

The method can include storing metadata information of the first data packet on the distributed ledger. For example, in FIG. 3, metadata information of the first data packet 110 is stored on the distributed ledger 303. The metadata information can include descriptive metadata that can be a resource for purposes such as discovery and identification. It can also include elements such as title, abstract, author, and keywords. The metadata information can also include structural metadata that can be about containers of data and indicates how compound objects are put together, for example, how pages are ordered to form chapters. It can also include the types, versions, relationships and other characteristics of digital materials. The metadata information can also include administrative metadata that provides information to help manage a resource, such as when and how it was created, file type and other technical information, and who can access it. The metadata can be used for triage in specific cases. These specific cases may be ordinary or extraordinary cases or a combination of both.

The method can include storing the hashed portion of the first data packet parsed by the second device in a second computer memory device, and clearing the second computer memory device after the storing on the distributed ledger. For example, in FIG. 3, the remote device 200 can store the hashed portion of the first data packet 100 parsed by the remote device 200, and clear the memory 306 after storing on the distributed ledger 303. The memory 306 can be a temporary memory that can include a volatile memory that can be stored by a random access memory (RAM) chip.

The method can include digitally signing the hashed portion of the combined hashed portions of the first and second data packets using the second device. For example, in FIG. 3, the remote node device 200 can digitally sign the hashed portion of the combined hashed portions of the first and second data packets. The digitally signing can include a process of digitally signing executable(s) and scripts to confirm the software author and guarantee that the code has not been altered or corrupted since it was signed. In an exemplary embodiment, the process of digitally signing can employ the use of a cryptographic hash to validate authenticity and integrity.

The method can include that the index identifier includes at least protocol data unit (PDU) information. For example, the index identifier α can include at least the PDU information that is delivered as a unit among peer entities of a computer network and that may contain control information, such as network address, or user data. The PDU information can be a unit of data which is specified in a communications protocol of a given layer and which consists of protocol-control information and possibly user data of that layer.

FIG. 4 illustrates exemplary node device architecture 400 with a processor 401 for implementing an embodiment of the present disclosure that performs the FIG. 1 method. The FIG. 2 remote node device architecture can also be executed by one or more processors such as processor 401. The node device, for example, can include the processor 401 and an associated memory 402. The processor 401 may include any integrated circuit or other electronic device (or collection of devices) capable of performing an operation on at least one instruction including, without limitation, Reduced Instruction Set Core (RISC) processors, CISC microprocessors, Microcontroller Units (MCUs), CISC-based Central Processing Units (CPUs), and Digital Signal Processors (DSPs). The hardware of such devices may be integrated onto a single substrate (e.g., silicon "die"), or distributed among two or more substrates. Furthermore, various functional aspects of the processor 401 may be implemented solely as software or firmware associated with the processor 401. The associated memory 402 can be volatile (such as RAM), non-volatile (such as ROM, flash memory, etc.) or some combination of the two. The computer memory includes, but is not limited to, RAM, ROM, EEPROM, flash memory or other memory technology CDROM, digital versatile disks (DVD) or other optical storage, magnetic cassettes, magnetic tape, magnetic disk storage or other magnetic storage devices, or any other medium which can be used to store the desired information and which can accessed by the device.

The processor 401 can include a parsing module 410 that can be configured to parse a first data packet 110 into at least one portion, wherein the at least one portion includes a portion designated as an index identifier $\alpha$. The parsing module 410 can incorporate functions of a computer's central processing unit (CPU) on one or more integrated circuits (IC). The parsing module 410 can be a multipurpose, clock driven, register based, digital-integrated circuit that can accept binary data as input, can process it according to instructions stored in memory, and can provide results as output. The parsing module 410 can be configured to contain both combinational logic and sequential digital logic. Parsing the first data packet 110 can include analyzing the data packet into one or more portions and describe the role of each of the portions. The index identifier $\alpha$ can be a unique identifier that can be used to index the first data packet.

The processor 401 can include a hashing module 420 configured to hash the at least one portion of the first data packet using the index identifier $\alpha$, and hash at least one portion of a second data packet 120 using the index identifier $\alpha$. The hashing module 420 can incorporate functions of a computer's central processing unit (CPU) on one or more integrated circuits (IC). The hashing module 420 can be a multipurpose, clock driven, register based, digital-integrated circuit that can accept binary data as input, can process it according to instructions stored in memory, and can provide results as output. The hashing module 420 can be configured to contain both combinational logic and sequential digital logic. Hashing can include a function that can be used to map data of any size to a fixed size. One use of hashing is a data structure called a hash table that is widely used in computer software for rapid data lookup. Hash functions can accelerate table or database lookup by detecting duplicated records in a large file.

The processor 401 can be configured to combine the hashed portions of the first data packet and the second packet. The combining of the hashed portions of the first data packet and the second data packet can include a merging of the two data packets that can use the index identifier as a key to merge the two data packets.

The parsing module 410 can be configured to hash at least one portion of the combined hashed portions of the first data packet and the second packet into a first combined data packet hash. Hashing can include mapping one or more portions of the combined hashed portion of the first data packet to one or more portions of the combined hashed portion of the second data packet, using the index identifier.

The processor 401 can be configured to receive a second combined data packet hash from a distributed ledger, and can include a comparator module 412 configured to compare the first combined data packet hash and the second combined data packet hash to provide an indication of network security. The comparator module 412 can be a multipurpose, clock driven, register based, digital-integrated circuit that can accept binary data as input, can process it according to instructions stored in memory, and can provide results as output. The comparator module 412 can be configured to contain both combinational logic and sequential digital logic.

The processor 401 can be configured to store the hashed portion of the first data packet in combination with a hashed portion of a second data packet in the associated memory, identify the second data packet 120 as a response to the first data packet 110, and concatenate plurality of portions of the first data packet into a string, and the at least one portion includes the string.

The concatenated string can include joining of the plurality of portions of the first data in a string format. String concatenation can be performed by using a binary infix operator. The +(plus) operator can be overloaded to denote concatenation for string arguments. Other separate operators can be used for string concatenation, particularly to specify implicit type conversion to string, as opposed to more complicated behavior for generic plus. String concatenation can be performed without any operator. JavaScript Object Notation can be an open-standard file format that uses human-readable text to transmit data objects consisting of attribute-value pairs and array data types (or any other serializable value). JSON can be a language-independent data format.

It will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

What is claimed is:

1. A method of securing a proof of authority based computer network for a control system by augmenting security provided by cryptographic hashing functions with distributed ledger technology, the method comprising:
   parsing a first data packet into at least one portion using a first device, wherein the at least one portion includes a portion designated as an index identifier;
   hashing the at least one portion of the first data packet using the first device and the index identifier;
   hashing, using the first device and the index identifier, at least one portion of a second data packet;
   combining, using the first device and the index identifier, the hashed portions of the first data packet and the second data packet;

hashing, using the first device and the index identifier, at least one portion of the combined hashed portions of the first data packet and the second data packet into a first combined data packet hash;

receiving a second combined data packet hash from a distributed ledger, wherein the distributed ledger is implemented on a peer-to-peer network as a blockchain system;

detecting whether the computer network is secure by comparing the first combined data packet hash and the second combined data packet hash; and reporting that the computer network is secure if the first combined data packet hash and the second combined data packet hash are determined to be identical.

2. The method of claim 1, comprising:
parsing the first data packet using a second device and the index identifier;
hashing, using the second device and the index identifier, at least one portion of the first data packet parsed by the second device;
parsing the second data packet using the second device and the index identifier;
hashing, using the second device and the index identifier, at least one portion of the second data packet parsed by the second device;
combining, using the second device and the index identifier, the hashed portions of the first data packet and the second data packet;
hashing, using the second device and the index identifier, at least one portion of the combined hashed portions of the first data packet and the second data packet;
storing, using the second device, the hashed portion of the combined hashed portions on the distributed ledger.

3. The method of claim 1, comprising:
transmitting the first data packet from an administrative device to the first device.

4. The method of claim 3, comprising:
transmitting the second data packet from a remote device to the administrative device.

5. The method of claim 1, comprising:
transmitting the first data packet from a remote device to the first device.

6. The method of claim 4, wherein the remote device is an endpoint device.

7. The method of claim 1, wherein the second data packet is a response to the first data packet.

8. The method of claim 2, comprising:
transmitting the second data packet from a remote device, wherein the second device is the remote device.

9. The method of claim 1, wherein the at least one portion of the first data packet includes a concatenated string of at least a plurality of portions of the first data packet.

10. The method of claim 9, wherein the concatenated string includes a Javascript Object Notation (json).

11. The method of claim 1, wherein the first data packet includes at least one of routing information, payload information, and the index identifier.

12. The method of claim 1, wherein the second data packet includes at least one of routing information, payload information, and the index identifier.

13. The method of claim 1, comprising:
storing the hashed portion of the first data packet in combination with the hashed portion of the second data packet in a computer memory device that is local to the first device or remote.

14. The method of claim 13, wherein the computer memory device is a database or a log file.

15. The method of claim 2, wherein the distributed ledger is configured on at least one of at least one computer memory device located external to the first device and the second device, the first device, and the second device.

16. The method of claim 15, wherein the at least one computer memory device is different types of memory.

17. The method of claim 1, comprising:
storing metadata information of the first data packet on the distributed ledger.

18. The method of claim 2, comprising:
storing the hashed portion of the first data packet parsed by the second device in a second computer memory device; and
clearing the second computer memory device after the storing on the distributed ledger.

19. The method of claim 1, wherein
the second computer memory device is a temporary memory.

20. The method of claim 2, comprising:
digitally signing the hashed portion of the combined hashed portions of the first and second data packets using the second device.

21. The method of claim 1, wherein the index identifier includes at least protocol data unit (PDU) information.

22. A network device for securing a proof of authority based computer network for a control system by augmenting security provided by cryptographic hashing functions with distributed ledger technology, the network device comprising:
a processor and an associated memory, wherein the processor includes:
a parsing module configured to parse a first data packet into at least one portion, wherein the at least one portion includes a portion designated as an index identifier; and
a hashing module configured to hash the at least one portion of the first data packet using the index identifier, and hash at least one portion of a second data packet using the index identifier,
wherein the processor is configured to combine the hashed portions of the first data packet and the second packet using the index identifier,
wherein the parsing module is configured to hash at least one portion of the combined hashed portions of the first data packet and the second packet into a first combined data packet hash using the index identifier,
wherein the processor is configured to receive a second combined data packet hash from a distributed ledger, wherein the distributed ledger is implemented on a peer-to-peer network as a blockchain system, and detect whether the computer network is secure by a comparison of the first combined data packet hash and the second combined data packet hash, and
wherein the processor is configured to report that the computer network is secure if the first combined data packet hash and the second combined data packet hash are determined to be identical.

23. The network device of claim 22, wherein the processor is configured to store the hashed portion of the first data packet in combination with a hashed portion of a second data packet in the memory.

24. The network device of claim 22, wherein the processor is configured to identify the second data packet as a response to the first data packet.

25. The network device of claim 22, wherein the processor is configured to concatenate at least a plurality of portions of the first data packet into a string, and the at least one portion includes the string.

\* \* \* \* \*